(12) United States Patent
Yu et al.

(10) Patent No.: US 6,961,797 B2
(45) Date of Patent: Nov. 1, 2005

(54) COMPUTER SYSTEM USING AN INTERFACING CIRCUIT TO INCREASE GENERAL PURPOSE INPUT/OUTPUT PORTS

(75) Inventors: Chia-Hsing Yu, San-Chung (TW); Hsuan-I Wang, Chung-Ho (TW); Chi-Hsing Lin, Hsin-Tien (TW)

(73) Assignee: VIA Technologies Inc., Hsin-Tien (TW)

( * ) Notice: Subject to any disclaimer, the term of this patent is extended or adjusted under 35 U.S.C. 154(b) by 500 days.

(21) Appl. No.: 10/063,449

(22) Filed: Apr. 24, 2002

(65) Prior Publication Data

US 2002/0169916 A1 Nov. 14, 2002

(30) Foreign Application Priority Data

May 11, 2001 (TW) ................................ 90111344 A

(51) Int. Cl.[7] ......................... G06F 13/14; G06F 13/12
(52) U.S. Cl. ....................................... 710/305; 710/71
(58) Field of Search ........................ 710/305, 69, 70, 710/71, 316; 370/463

(56) References Cited

U.S. PATENT DOCUMENTS

| | | | | |
|---|---|---|---|---|
| 3,665,398 A | * | 5/1972 | Kawai et al. | 340/825.5 |
| 5,826,068 A | * | 10/1998 | Gates | 713/600 |
| 5,857,082 A | * | 1/1999 | Murdoch et al. | 710/310 |
| 5,995,507 A | * | 11/1999 | Fujita | 370/395.71 |
| 6,151,334 A | * | 11/2000 | Kim et al. | 370/468 |
| 6,725,315 B2 | * | 4/2004 | Yang et al. | 710/306 |

* cited by examiner

*Primary Examiner*—Rehana Perveen
*Assistant Examiner*—Jeremy S. Cerullo
(74) *Attorney, Agent, or Firm*—Winston Hsu

(57) ABSTRACT

According to the claimed invention, the computer system has a central processing unit, a north bridge electrically connected to the central processing unit, memory electrically connected to the north bridge, and a south bridge electrically connected to the north bridge, the south bridge having a general purpose serial input/output port. The computer also includes at least one peripheral device electrically connected to the south bridge and an interfacing circuit for providing a plurality of extended general purpose input/output ports, the interfacing circuit having a connection end electrically connected to the general purpose serial input/output port. When inputting a data signal from a general purpose input/output (GPIO) port, the data signal is transmitted to the general purpose serial input/output port through the connection end of the interfacing circuit.

14 Claims, 4 Drawing Sheets

COMPUTER SYSTEM USING AN INTERFACING CIRCUIT TO INCREASE GENERAL PURPOSE INPUT/OUTPUT PORTS

BACKGROUND OF INVENTION

1. Field of the Invention

The present invention relates to a computer system, and more particularly, to a computer system providing more general purpose input/output (GPIO) ports without increasing pins on a south bridge.

2. Description of the Prior Art

In this society, computer systems widely used in every industry are playing an important role in many companies for modernization. With improvements such as an increasing data storage density, a rising operation speed, a decreasing production cost, and a friendlier user interface in computer systems, simple computer systems, including a personal computer (PC), can act an information-processing center. Therefore, connecting peripheral devices to a simple computer system to help automate and manage business is deeply expected by many companies. A product monitoring system will be used as an example. While human operation mistakes are unavoidable in affecting the monitoring procedure in a human monitoring system, a detection device for the monitoring system can be connected to a computer system. The detection device can use the computer system to make the monitoring procedure automated. The computer system has great storing and computing capabilities used to analyze the detected product information, which can provide information about production yields and product development. To achieve these objectives, engineers are researching to enhance computer capabilities.

Please refer to FIG. 1, which shows a function block diagram for a computer system 10 according to the prior art. The computer system 10 includes a central processing unit (CPU) 12, a north bridge 20, and a south bridge 30. The CPU 12 is responsible for managing all of the circuits in the computer system 10. The north bridge 20 is electrically connected to the CPU 12 and is responsible for exchanging data of the CPU 12 with memory (such as a random access memory) 18 or with a graphics accelerator 14. A display device (such as a monitor) 16 is electrically connected to the graphics accelerator 14 to provide a video output for the computer system 10. The south bridge 30 is electrically connected to the north bridge 20 to exchange data of the CPU 12 with a peripheral device 22. The peripheral device 22 includes an input device (such as a keyboard or a mouse), a basic input/output system (BIOS), and a nonvolatile memory (such as a hard disk).

The south bridge 30 includes a GPIO port 24 to provide another way for inputting or outputting data through an external device. When using the computer system 10 to exchange data with an external device 28 (such as a detective device mentioned above), the external device 28 uses a GPIO circuit 26 to connect to the GPIO port 24 so as to complete the connection of the external device 28 with the computer system 10. The GPIO circuit 26 is responsible for converting a data signal that is outputted from the external device 28 into a readable format for the GPIO port 24. In addition, the GPIO circuit 26 is responsible for converting a command that is transmitted from the CPU 12 to the GPIO port 24 into a readable format for the external device 28.

Due to the many advances in computer systems, computer systems are capable of processing a lot of data at the same time. In this case, companies expect to use a computer system to exchange data with a plurality of external devices at the same time so as to reduce computerization management costs, integrate data from external devices, and synchronize operations of the external devices. However, while using the computer system 10 of the prior art, the GPIO ports 24 provided by the south bridge 30 are limited in numbers. In addition, as the south bridge is formed in a chip, it is very difficult to increase the number of GPIO ports on the south bridge without the redesign of the chip. The circuits of the south bridge 30 are very complicated because the south bridge has to provide a data exchange path between the GPIO port 24 and the CPU 12, and at the same time the south bridge has to manage operations of the peripheral devices 22 connected to the computer system 10. As a result, a lot of time and cost are required to either redesign or reform the south bridge.

SUMMARY OF INVENTION

It is therefore an objective of the claimed invention to provide a computer system that provides a plurality of GPIO ports to overcome the difficulty in increasing the ports in the prior art computer system.

According to the claimed invention, the computer system has a central processing unit, a north bridge electrically connected to the central processing unit, memory electrically connected to the north bridge, and a south bridge electrically connected to the north bridge, the south bridge having a general purpose serial input/output port. The computer also includes at least one peripheral device electrically connected to the south bridge and an interfacing circuit for providing a plurality of extended general purpose input/output ports, the interfacing circuit having a connection end electrically connected to the general purpose serial input/output port. When inputting a data signal from the general purpose input/output port, the data signal is transmitted to the general purpose serial input/output port through the connection end of the interfacing circuit.

It is an advantage of the claimed invention that the computer system adds the interfacing circuit therein to provide more GPIO ports than in the prior art. Therefore, the computer system exchanges data with more external devices without increasing the GPIO ports on the south bridge.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
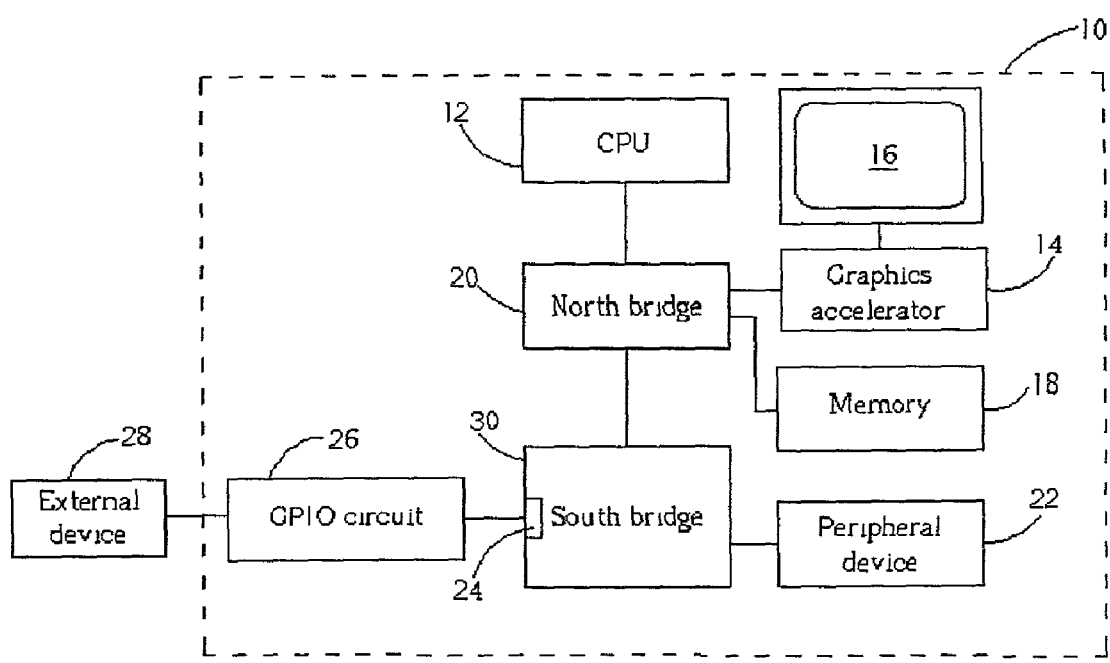
FIG. 1 is a function block diagram of a computer system according to the prior art.
Figure 2:
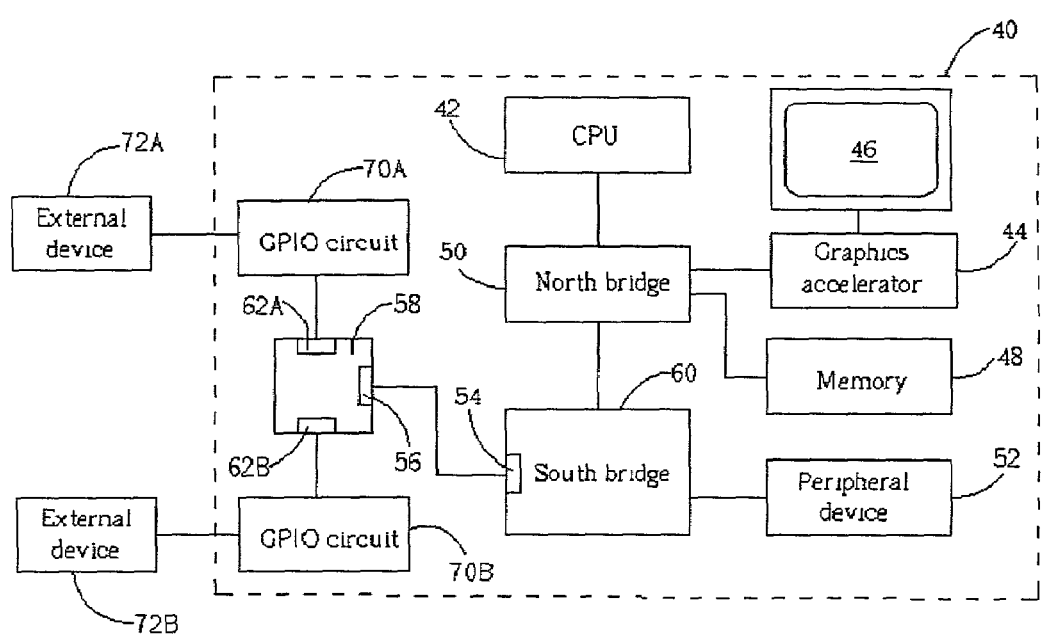
FIG. 2 is a function block diagram of a computer system according to a first embodiment of the present invention.

Please refer to FIG. 2, which shows a function block diagram of a computer system 40 according to the present invention. The computer system 40 includes a CPU 42, a north bridge 50 and a south bridge 60. The north bridge 50 is electrically connected to the CPU 42 and is responsible for exchanging data of the CPU 42 with a graphics accelerator 44 or with memory (such as a random access memory) 48. A display device 46 (such as a monitor) is electrically connected to the graphics accelerator 44 to provide a video output for the computer system 40. The south bridge 60 is electrically connected to the north bridge 50 and is responsible for exchanging data of the CPU 42 with a peripheral device 52. The peripheral device 52 includes an input device (such as a keyboard or a mouse), a basic input/output system (BIOS), and a non-volatile memory (such as a hard disk). In addition, the south bridge 60 further includes a general purpose serial input/output port 54, functioning as a GPIO. As the general purpose serial input/output port 54 replaces the conventional GPIO port, pins on the south bridge for setting the GPIO port can be used by the general purpose serial input/output port 54 instead of increasing other pins on the south bridge (normally in the form of a south bridge chip) for setting the general purpose serial input/output port 54.

The computer system 40 of the present invention is distinguished from the computer system 10 of the prior art by using an interfacing circuit 58 to provide more GPIO ports than the computer system 10. The interfacing circuit 58 includes a connection end 56 for electrically connecting with the general purpose serial input/output port 54 on the south bridge 60. In addition, the interfacing circuit 58 provides a plurality of extended GPIO ports, such as extended GPIO ports 62A and 62B shown in FIG. 2. In other embodiments of the present invention, the interfacing circuit 58 can provide more than two extended GPIO ports, therefore the numbers of the GPIO ports provided by the interfacing circuit 58 should not be limited. When using two external devices 72A and 72B to exchange data with the computer system 40, the external devices 72A and 72B have to connect to the GPIO circuits 70A and 70B to transmit data through the extended GPIO ports 62A and 62B, the connection end 56 of the interfacing circuit 58, the general purpose serial input/output port 54 on the south bridge 60, and finally use the south bridge 60 to exchange data with the CPU 42. To the above-mentioned prior art, the GPIO circuits connecting with different external devices have to convert the transmitted data into readable formats for the external devices and the extended GPIO ports so as to complete data exchange between the external devices and the computer system 40.

Briefly, the interfacing circuit 58 is capable of integrating data signals (which are transmitted through the extended GPIO ports 62A and 62B) of different external devices, and then using the connection end 56 to transmit the integrated data to the single general purpose serial input/output port 54 on the south bridge 60. On the contrary, the interfacing circuit 58 is also capable of using the general purpose serial input/output port 54 to transmit data from the south bridge 60 to the extended GPIO ports 62A and 62B, and then using the GPIO circuits 70A and 70B to deliver the corresponding data to the external devices 72A and 72B. To complete the data exchange, the interfacing circuit 58 has to use a data transmission protocol to integrate data signals transmitted from the plurality of extended GPIO ports into integrated data and then transmit this data to the general purpose serial input/output port 54 on the south bridge 60 through the connection end 56. The south bridge 60 also uses the data transmission protocol to decode the integrated data that is transmitted from the general purpose serial input/output port 54 so as to achieve the feature of the present invention of using a single general purpose serial input/output port to exchange data with a plurality of external devices. Alternatively, the south bridge 60 of the present invention also transmits the integrated data signals for the plurality of external devices together to the connection end 56 of the interfacing circuit 58 according to the above-mentioned data transmission protocol. Following this, the interfacing circuit 58 uses the data transmission protocol to decode the integrated data, and then connects each of the extended GPIO ports with a corresponding GPIO circuit so as to transmit the corresponding data to each of the external devices.

Figure 3:
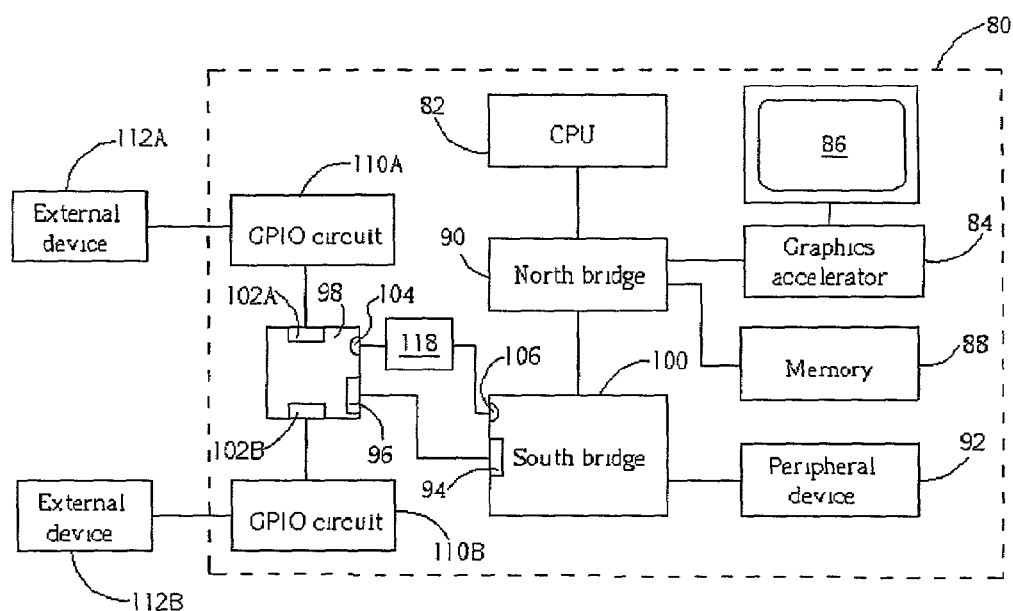
FIG. 3 is a function block diagram of a computer system according to a second embodiment of the present invention.

In order to adjust a data transmission clock, a pulse control end is set on the interfacing circuit for controlling clock pulses. Please refer to FIG. 3, which shows a computer system 80 of a second embodiment of the present invention. The computer system 80 includes some elements similar to the computer system 40 of the first embodiment, such as a CPU 82, a memory 88, a north bridge 90, a graphics accelerator 84, a display device 86, a peripheral device 92, a south bridge 100 connected with two GPIO circuits 110A and 110B, and two external devices 112A and 112B. In addition, the computer system 80 further includes an interfacing circuit 98 similar to the interfacing circuit 58 of the computer system 40. The interfacing circuit 98 includes a connection end 96 connected with a general purpose serial input/output port 94, and a plurality of extended GPIO ports 102A and 102B (only two extended GPIO ports are shown in FIG. 3) for electrically connecting to the GPIO circuits 110A and 110B, respectively. The interfacing circuit 98 further includes a second pulse control end 104 for connecting to a first pulse control end 106 set on the south bridge 100 through a pulse interfacing circuit 118. The pulse interfacing circuit 118 functions as an electrical connection end. The first pulse control end 106 on the south bridge 100 can use the pulse interfacing circuit 118 to transmit pulses to the second pulse control end 104 on the interfacing circuit 98, thereby controlling pulses for processing data exchange between the south bridge 100 and the interfacing circuit 98. In addition, the pulse interfacing circuit 118 also functions as a pulse generator for generating pulses (such as a peripheral component interconnect clock, PCI clock). In this case, the first pulse control end 106 and the second pulse control end 104 are used to control pulses from the south bridge 100 and the interfacing circuit 98, respectively, so as to synchronize the pulses of the south bridge 100 and the interfacing circuits 98 to enable data transmission between them.

Figure 4:
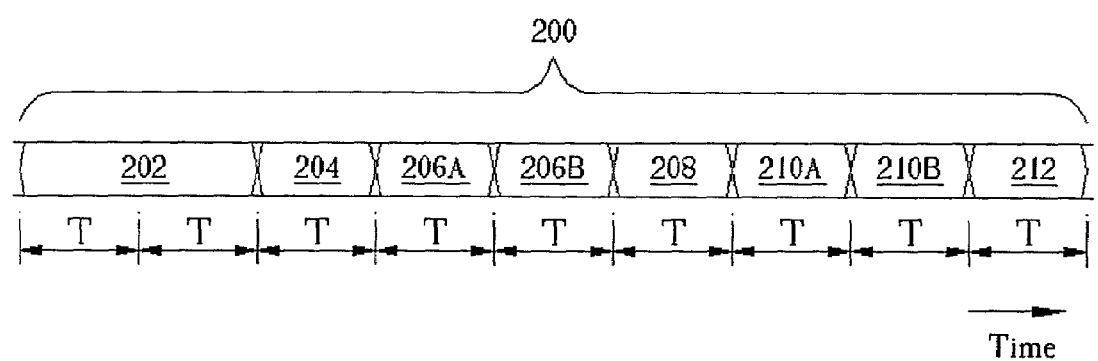
FIG. 4 is a time sequence diagram of using a computer system to exchange data according to the present invention.

Please refer to FIG. 4, which is a time sequence diagram of using a data transmission protocol to transmit data between the south bridge 100 and the interfacing circuit 98. The horizontal axis of FIG. 4 represents the data transmission time, and the serial signal 200 represents the exchanging data signals that are encoded using the data transmission protocol. When the south bridge 100 uses the interfacing circuit 98 to transmit data to the external devices, or when one of the external devices uses the interfacing circuit 98 to transmit data to the south bridge 100, the serial signal 200 is transmitted between the interfacing circuit 98 and the south bridge 100. According to the data transmission protocol, the serial signal 200 includes the following portions (which are produced in a time sequence): an initiating signal 202, a turnaround cycle 204, a plurality of general purpose output signals (only two general purpose output signals 206A, 206B are shown in FIG. 4), another turnaround cycle 208, a plurality of general purpose input signals (210A, 210B), and an idle signal 212. The initiating signal 202 occupies two pulse cycles (the pulse cycle is represented by T and a period of the pulse cycle is controlled by the pulses) and is viewed as a low-level signal for lasting two continuous pulse cycles. Following the turnaround cycle 204, the plurality of general purpose output signals 206A, 206B are produced; each of the general purpose output signals occupies a pulse cycle T. Each of the general purpose output signals corresponds to one of the GPIO circuits, and the numbers of the general purpose output signals are determined by the number of the GPIO circuits transmitting the general purpose output signals. For example, if four GPIO circuits are connected to the interfacing circuit and only two of the GPIO circuits transmit the general purpose output signals, the serial signal 200 includes two general purpose output signals. Following transmission of the plurality of general purpose output signals, the serial signal 200 has the turnaround cycle 208 lasting for a pulse cycle T. Subsequently, the plurality of general purpose input signals 210A, 210B are produced; each of the general purpose input signals occupies a pulse cycle T. Similar to the general purpose output signals, the numbers of the general purpose input signals are determined by the number of the GPIO circuits transmitting the general purpose input signals. It is notable that not all of the GPIO circuits transmit the general purpose input signals and the general purpose output signals. Some of the GPIO circuits transmit the general purpose output signals only (or the general purpose input signals only), and some of the GPIO circuits transmit both the general purpose output signals and the general purpose input signals. According to the present invention, the serial signal is capable of arranging the general purpose input signals and the general purpose output signals (the numbers of these two signals are not necessarily the same) to be transmitted in series. After transmission of the general purpose input signals, the serial signal 200 uses the idle signal 212 as a transmission end. By using the serial signal 200, the plurality of GPIO circuits connect the connection end 96 of the interfacing circuit 98 with the general purpose serial input/output port 94, so as to complete data exchange with the south bridge 100 or the CPU 82.

In contrast to the computer system of the prior art, which uses a limited GPIO port on a south bridge to connect an external device with the computer system for exchanging data, the computer system of the present invention adds an interfacing circuit therein so as to provide more GPIO ports than the prior art. As a result, the computer system is capable of exchanging data with more than one external device without increasing the GPIO ports on the south bridge according to the present invention.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer system comprising:
   a central processing unit;
   a north bridge electrically connected to the central processing unit;
   a memory electrically connected to the north bridge;
   a south bridge electrically connected to the north bridge, the south bridge having a general purpose serial input/output port;
   at least one peripheral device electrically connected to the south bridge; and
   an interfacing circuit for providing a plurality of extended general purpose input/output ports, the interfacing circuit having a connection end electrically connected to the general purpose serial input/output port, the interfacing circuit integrating data signals for a plurality of external devices connected to the extended general purpose input/output ports of the interfacing circuit into combined signal packets and transmitting the combined signal packets serially;
   wherein when inputting a data signal from the general purpose input/output port, the data signal is transmitted to the general purpose serial input/output port through the connection end of the interfacing circuit, and when outputting a data signal from the general purpose serial input/output port, the data signal is transmitted to the general purpose input/output port through the connection end of the interfacing circuit.

2. The computer system of claim 1 further comprising at least one general purpose input/output circuit electrically connected to the extended general purpose input/output port for generating the data signal.

3. The computer system of claim 2 wherein the general purpose input/output circuit is electrically connected to at least one external device, the general purpose input/output circuit generating the data signal according to an output of the external device.

4. The computer system of claim 1 further comprising a pulse generator electrically connected to the interfacing circuit and the south bridge for generating pulses for synchronizing the interfacing circuit and the south bridge so as to transmit the data signal.

5. The computer system of claim 4 wherein the pulse generator is a PCI clock (peripheral component interconnect clock).

6. The computer system of claim 1 wherein the interfacing circuit further comprises a pulse control end electrically connected to the south bridge, the interfacing circuit transmitting the data signal according to pulses provided by the south bridge.

7. The computer system of claim 1 wherein the interfacing circuit integrates data signals transmitted from each of the extended general purpose input/output ports according to a data transmission protocol and then transmits the integrated data signals to the general purpose serial input/output port through the connection end.

8. The computer system of claim 1 wherein the interfacing circuit integrates data signals transmitted from each of the extended general purpose input/output ports into a serial signal according to a data transmission protocol and then transmits the serial signal to the general purpose serial input/output port through the connection end.

9. The computer system of claim 8 wherein the serial signal comprises an initiating signal.

10. The computer system of claim 8 wherein the data signals inputted from the general purpose input/output ports are serially arranged in the serial signal.

11. The computer system of claim 1 wherein each of the combined signal packets comprise output data signals for each of the external devices which transmit output data and input data signals for each of the external devices which receive input data.

12. The computer system of claim 11 wherein the output data signals for each of the external devices are transmitted in succession within the combined signal packets and the input data signals for each of the external devices are transmitted in succession within the combined signal packets.

13. The computer system of claim 12 wherein each of the combined signal packets comprise the output data signals for each of the external devices transmitted in succession, followed by a turnaround cycle, and followed by the input data signals for each of the external devices transmitted in succession.

14. The computer system of claim 13 wherein each of the combined signal packets comprise an initiating signal, followed by a turnaround cycle, followed by the output data signals for each of the external devices transmitted in succession, followed by another turnaround cycle, followed by the input data signals for each of the external devices transmitted in succession, and followed by an idle signal.

* * * * *